Nov. 25, 1969  H. LUDWIG  3,480,704
SHOE WITH INJECTION MOLDED BOTTOM PROVIDED WITH DENSE EDGE
STRIP, AND METHOD AND APPARATUS FOR MAKING THE SAME
Filed March 10, 1966  2 Sheets-Sheet 1

Inventor
Herbert Ludwig
by Roberts, Cushman & Grover
Attys

United States Patent Office 3,480,704
Patented Nov. 25, 1969

3,480,704
SHOE WITH INJECTION MOLDED BOTTOM PROVIDED WITH DENSE EDGE STRIP, AND METHOD AND APPARATUS FOR MAKING THE SAME
Herbert Ludwig, Desmastr. 112, Uesen, near Bremen, Germany
Filed Mar. 10, 1966, Ser. No. 533,189
Int. Cl. A43d 65/00; A43b 9/16; B29h 7/08
U.S. Cl. 264—45                          3 Claims

ABSTRACT OF THE DISCLOSURE

A method of shoe making comprising injecting plastisol containing a foaming agent into a mold beneath a lasted upper held against the top, allowing the plastisol to expand to form a cushion sole of the desired shape and thickness and then injecting plastisol that does not contain a foaming agent into the mold around the edge of the sole to form a dense edge strip peripherally of the sole. The method also includes injecting an already expanded plastisol into a cavity of the desired shape and depth and thereafter applying the dense edge strip to the peripheral edge thereof.

---

In order to obtain a shoe embodying softness for comfort and durability for wear, it is customary to form the sole with an inner cushion layer of porous sponge-like quality and an outer tread layer of dense wear-resistant quality. Such soles, however, are not wholly satisfactory because the peripheral edge is relatively soft and apt to be torn, has a dull lusterless surface, and since it is of a sponge-like character is apt to absorb moisture which will penetrate through the sole to the interior of the shoe.

The objects of this invention are to provide a bottom embodying the desirable characteristics of softness and durability alluded to above without its disadvantages, to wit, to provide a bottom with a wear-resistant dense and smooth peripheral edge surface and/or tread surface; to provide a bottom which embodies an interior cushion which affords comfort and an edge strip which is lustrous and affords the apperance of a solid sole; to provide a sole which is not absorptive of moisture; and to provide a sole which has a lateral extension simulating welt footwear. Further objects of the invention are to provide a novel method of forming a bottom structure by injection molding embodying the foregoing characteristics and an apparatus for practicing the method.

The footwear made according to the invention comprises a bottom structure of elastomer embodying a porous sole member substantially coextensive with the bottom of the upper, and a non-porous dense edge strip peripherally of the sole member. The porous sole member may be the full thickness of the bottom and as such is attached directly to the bottom of the lasted upper, for example the lasting margin or an insole, or it may be attached to the inner side of the edge strip, the latter being attached at its upper edge to the upper at the shoulder. The edge strip projects laterally from the sole member forming a sole extension simulating a welt shoe construction. Optionally, the edge strip may be of lesser height than the full thickness of the bottom structure, that is its upper edge may terminate below the shoulder and the sole member may extend beyond the shoulder above the upper edge of the edge strip, so that the top of the extension will be comprised of a thin layer of the porous material of the sole member. The tread surface of the sole member may be of the same softness as the sole member itself or may have a dense surface layer constituted by a modification of the structure of the sole member at the surface or by an added non-porous layer coextensive with the bottom surface of the sole layer and integral at its edges with the lower edge of the side strip.

For making the shoe a mold assembly embodying a split side ring and sole plate are employed wherein the split ring is enlarged by the amount of the bottom extension desired and a bottom ring is mounted about the sole plate for movement within the split ring relative to the bottom of the lasted upper. The bottom ring is first raised all the way to the top of the split ring so as to have contact with the bottom of the upper, the sole plate is lowered to a position corresponding to the thickness of the sole member to be formed, and a foamable elastomer is injected into the mold cavity bounded by the bottom of the upper above, the top of the sole plate below and the inner surface of the bottom ring. The injected foamable elastomer is allowed to foam and set whereupon the bottom ring is lowered to the level of the sole plate and a dense non-foamable elastomer is injected into the cavity bounded at the top by the lip of the split ring and in the shoulder of the upper, at the bottom of the upper edge of the bottom ring, at one side by the inner surface of the split ring, and at the other by the edge of the previously injected sole member. The injection to form the sole member may be carried out either to provide a porous tread surface or to provide a dense non-porous layer at the tread surface, and it is contemplated that a filling layer may be applied to the bottom of the lasted upper prior to the first injection. Optionally, the bottom ring may not be raised all the way to the shoulder of the upper so that during the first injection the foamable elastomer will spread all the way to the inner side of the split ring at the shoulder. Additionally, the sole plate may be lowered after the first injection to provide a cavity below the injected sole member for injection of a non-foaming elastomer to provide a dense non-porous facing layer at the tread surface of the sole member integral at its edges with the lower edge of the edge strip.

The invention will now be described in greater detail with reference to the accompanying drawings wherein.

Figure 1:
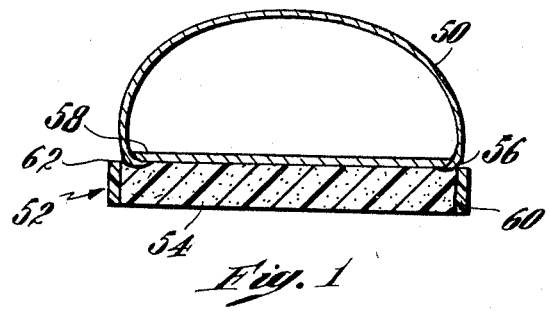
FIG. 1 is a vertical section taken transversely of a shoe having a bottom comprised of a porous elastomer provided with a non-porous edge strip and wherein the upper edge of the edge strip constitutes a sole extension.
Figure 2:
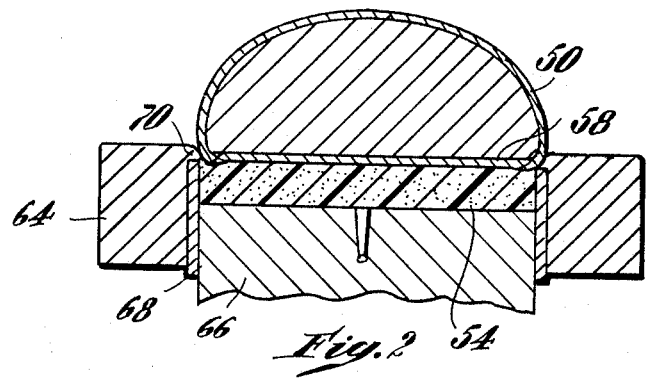
FIGS. 2 and 3 are vertical transverse sections of a mold assembly for making the shoe shown in FIG. 1.
Figure 3:
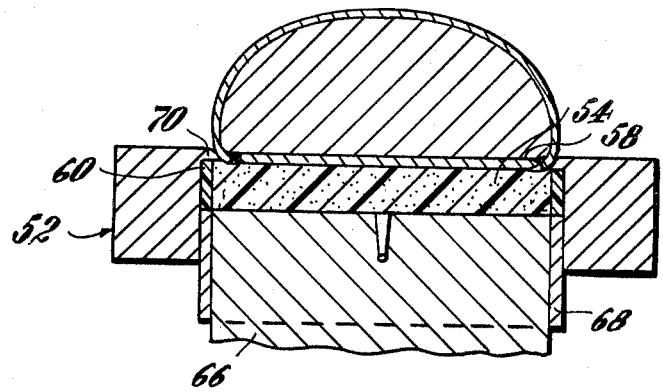

Referring to the drawings (FIG. 1), there is shown a vertical section through a shoe made according to this invention which comprises an upper 50 and a bottom structure 52 partially or wholly of an elastomer. The bottom structure 52 comprises a sole member 54 of a porous sponge-like material united directly to the lasting margin 56 of the upper and/or to an insole 58. An adhesive (not shown) may be applied to the exposed surface of the lasting margin and the insole to enhance the bond between the sole member and the bottom of the shoe. An edge strip 60 comprised of a dense non-porous elastomer bounds the peripheral edge face of the sole member 54 and its upper edge 62 projects laterally from the shoulder of the upper forming a bottom extension simulating a welt shoe construction. It is within the scope of the invention to form an edge strip which does not protrude and which serves solely as a wear strip.

A midsole or filler of felt or similar cushion-like material (not here shown) may be inserted between the bottom of the lasted upper and the sole member 54 and the exposed outer surface of the sole member 54 may be made dense and non-porous to provide a wear-resistant tread, for example, as illustrated and described in my pending application Ser. No. 480,863, filed Aug. 19, 1965.

The shoe illustrated in FIG. 1 is made by using a mold assembly comprised of a split side ring 64, a sole plate 66 and a bottom ring 68. The split ring 64 has at its top a peripheral lip 70 on which the lasted upper is adapted to be held and below the lip is recessed, so that the inside of the side ring is enlarged by an amount corresponding to the width of the bottom extension desired. The sole plate and bottom ring 66 and 68 respectively, are movable within the split ring relative to the bottom of the lasted upper. In operation, the bottom ring 68 is raised within the split side ring 64 until its upper edge abuts the lower side of the lip 70 and/or the shoulder of the last, the sole plate 66 is lowered to a position to afford room for predetermined quantities of unfoamed elastomer and then the unfoamed elastomer is injected into the mold cavity, the latter being bounded at the top by the bottom of the lasted upper, at the bottom by the top of the sole plate and at the outer side by the inner surface of the bottom ring. The injected elastomer is allowed to expand (foam) and set whereupon the bottom ring 68 is lowered to the level of the bottom plate and a non-foamable dense elastomer is injected into the cavity between the underside of the lip 70 and/or the shoulder of the lasted upper, the upper edge of the bottom ring, the inner surface of the split ring and the peripheral edge of the previously injected sole member to form the edge strip 60. If a polyurethane is employed, the sole plate may be lowered at once to a position corresponding to the final volume or thickness of the sole member thus omitting the intermediate step referred to above.

Figure 4:
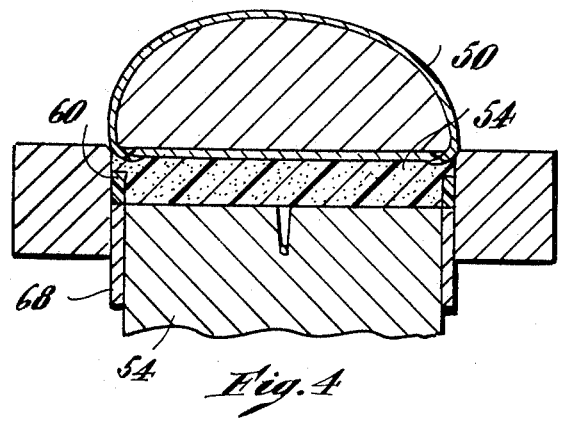
FIG. 4 is a transverse section of a shoe and mold assembly modified to form a sole extension having an upper porous surface.

It may be desirable to form the top surface of the bottom extension of the porous material of which the sole member is comprised while retaining the dense character of the major portion of the side or surface of the edge strip. This can be readily achieved (FIG. 4) with the mold assembly described above by raising the bottom ring 68 up to but not engaged with the underside of the lip 70 and/or the shoulder of the last, leaving a very shallow clearance therebetween and then injecting the foamable elastomer so that it spreads laterally between the upper edge of the bottom ring and the underside of the lip all the way to the inner side of the split ring. The bottom ring is now lowered and the non-foamable dense elastomer injected as before. Thus, the top surface of the extension adjacent the shoulder is porous and the side surface subjacent thereto is dense and non-porous. The porous layer at the top of the edge strip provides a very effective bond between the upper edge of the edge strip and the upper at the shoulder.

Figure 5:
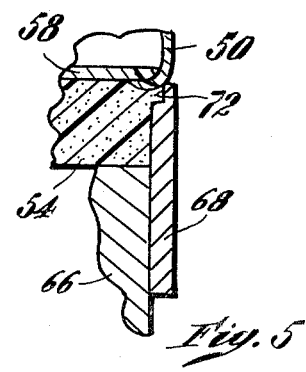
FIG. 5 is a fragmentary section showing an alternative form of the bottom ring provided with an inwardly facing groove at its upper edge.

If it is desirable to have only a part of the upper surface of the extension of porous character and to extend the dense material all the way to the top to simulate a solid bottom structure, the upper edge of the bottom ring may be provided with an inwardly facing groove 72 (FIG. 5). Here, again, the porous elastomer improves the bond between the edge strip and the upper.

As stated above, the exposed surface of the sole member 54 may be made dense and wear-resistant by maintaining the sole plate at a predetermined first position and employing a foamable material which remains quiescent for a predetermined period of time before it becomes effective to produce foaming, so that during this initial period, the injected plastic next to the sole plate will set up and harden before the foaming takes place thus forming a dense surface. Following this period of initial setting, the sole plate is lowered to enable foaming and expansion to form the porous cushion-like sole member desired.

Figure 6:
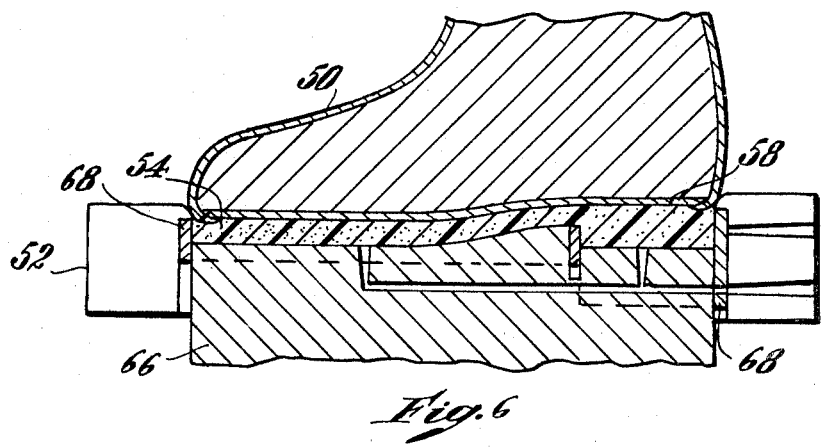
FIGS. 6 and 7 are vertical sections longitudinally of a shoe and mold assembly showing the steps of first forming a porous sole member and then applying a dense non-porous edge strip and tread surface to the sole member.
Figure 7:
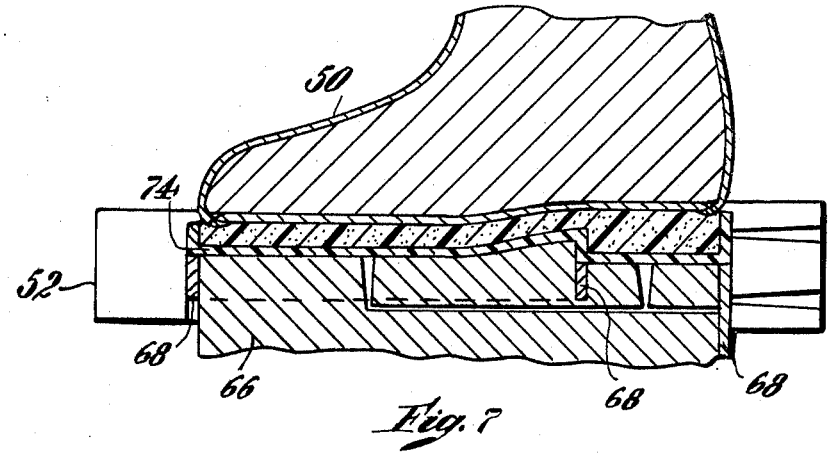

Alternatively, an additional layer of dense wear-resistant elastomer 74 may be applied to the exposed surface of the sole member at the same time that the edge strip is formed. This is accomplished as shown in FIGS. 6 and 7 by first raising the bottom ring 68 (FIG. 6) into engagement with or slightly below the lip of the split side ring, lowering the sole plate to a first position, injecting a suitable quantity of unfoamed foamable elastomer, lowering the sole plate to permit the desired expansion of the elastomer, and since the formation of a dense surface by modifying the character of the foamable material is not a consideration, a position corresponding to the final thickness of the bottom less the thickness of the dense layer which is to be applied and allowing the elastomer to expand and set. The sole plate is now lowered by an amount corresponding to the thickness of the dense layer to be applied, the bottom ring is lowered to a corresponding position and a non-foamable dense elastomer is injected to form the bottom layer and the edge strip simultaneously.

A two-part bottom ring, as shown in FIGS. 6 and 7, is employed to form the heel with an inner core of porous elastomer and an outer cover of dense elastomer.

The advantages obtained from the modified construction are principally to improve the appearance of the shoe by forming a sole extension and to provide resistance to wear and penetration of moisture into the bottom in addition to lightness and foot comfort.

The term "elastomer" as herein used is intended to embrace any and all plastics or plastic-like materials embodying characteristics of elasticity and capable of being rendered plastic for a sufficient length of time to be injected into a mold to form the bottom part of a shoe and to be then caused to set, cure or otherwise become dimensionally stable. Polyurethane is preferred because it is self-bonding and does not require an adhesive.

It should be understood that the present disclosure is for the purpose of illustration only and that this invention includes all modifications and equivalents which fall within the scope of the appended claims.

I claim:

1. The method of making footwear with a mold assembly comprising and open top mold embodying a side ring, a sole plate of smaller area than the side ring and a bottom ring situated between the sole plate and the side ring, comprising raising the bottom ring within the side ring to a position of engagement with the bottom of the lasted upper, lowering the sole plate from the bottom of the lasted upper to a first position to provide a first cavity below the bottom of the upper, injecting a first body of polyurethane in said first cavity to form a first layer filling it, curing the lower surface of said first layer, lowering the sole plate to a second position to form a second cavity of increased depth, expanding the polyurethane interiorly of the cured lower surface of the first layer to fill said second cavity of increased depth to form a cushion sole, allowing the expanded polyurethane to cure, lowering the bottom ring to a level corresponding to the level of the sole plate at said second position to form a third cavity around the cushion layer, injecting a second body of polyurethane into said third cavity around the cushion layer, and allowing it to cure while confined at the top and bottom by the bottom of the lasted upper marginally of the cushion layer and the top of the bottom ring, and on the outside and inside by the side ring and the peripheral edge of the cushion layer.

2. The method of making footwear with a mold assembly comprising an open top mold embodying a side ring, a sole plate of smaller area than the side ring and a bottom ring situated between the sole plate and the side ring, comprising raising the bottom ring within the side ring to a position of engagement with the bottom of the lasted upper, lowering the sole plate from the bottom of the lasted upper to a first position to provide a first cavity below the bottom of the upper, injecting a first body of polyurethane into said first cavity to fill it, lowering the sole plate to a second position to form a second cavity of increased depth, expanding the polyurethane to fill said second cavity of increased depth to form a cushion layer, and allowing it to cure, lowering the sole plate to a third position to form a third cavity beneath the cushion layer between the cushion layer and the sole plate, lowering the bottom ring to the level of the sole plate at said third position to form a cavity around the cushion layer, injecting a second body of polyurethane into said second cavity beneath the cushion layer and the third cavity around the cushion layer, and allowing it to cure while confined at the top by the marginal edge of the upper around the cushion layer and at the bottom by the upper surfaces of the bottom ring and sole plate, at the outer side by the side ring and at the inner side by the peripheral edge of the cushion layer.

3. The method of making footwear with a mold assembly comprising an open top mold embodying a side ring, a sole plate of smaller area than the side ring and a bottom ring situated between the sole plate and the side ring, comprising lowering the bottom ring to a first position within the side ring below the bottom of the lasted upper, lowering the sole plate to a first position which is lower than the bottom ring to provide a first cavity below the upper having a part next to the bottom of the lasted upper which is of greater area than that subjacent thereto, injecting a first body of polyurethane into said first cavity to fill it, lowering the sole plate to a second position to form a second cavity of greater depth, expanding said first body of polyurethane into said second cavity to form a cushion layer, and allowing it to cure, lowering the sole plate to a third position to form a third cavity beneath the cushion layer, lowering the bottom ring to the level of the sole plate at said third position to form a fourth cavity around the cushion layer, injecting a second body of polyurethane into the third cavity beneath the sole plate and the fourth cavity around the cushion layer, and allowing the polyurethane to cure while thus confined.

References Cited

UNITED STATES PATENTS

| | | | |
|---|---|---|---|
| 3,007,209 | 11/1961 | Roberts | 264—244 XR |
| 3,246,068 | 4/1966 | Ferriera | 264—244 |
| 3,175,308 | 3/1965 | Werman et al. | 264—244 |

JULIUS FROME, Primary Examiner

L. GARRETT, Assistant Examiner

U.S. Cl. X.R.

264—46, 244